United States Patent
Farooq

(10) Patent No.: US 11,706,606 B2
(45) Date of Patent: *Jul. 18, 2023

(54) NETWORK REPOSITORY FUNCTION (NRF) DISCOVERY CONTROL

(71) Applicant: T-Mobile USA, Inc., Bellevue, WA (US)

(72) Inventor: Muhammad Adnan Farooq, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/672,616

(22) Filed: Feb. 15, 2022

(65) Prior Publication Data

US 2022/0174471 A1 Jun. 2, 2022

Related U.S. Application Data

(63) Continuation of application No. 16/752,498, filed on Jan. 24, 2020, now Pat. No. 11,265,694.

(51) Int. Cl.

| | |
|---|---|
| *H04L 12/00* | (2006.01) |
| *H04W 8/00* | (2009.01) |
| *H04W 88/14* | (2009.01) |
| *H04W 60/04* | (2009.01) |
| *H04L 67/00* | (2022.01) |
| *H04L 67/10* | (2022.01) |

(Continued)

(52) U.S. Cl.
CPC .............. *H04W 8/005* (2013.01); *H04L 67/10* (2013.01); *H04L 67/34* (2013.01); *H04L 67/51* (2022.05); *H04L 69/28* (2013.01); *H04W 60/04* (2013.01); *H04W 88/14* (2013.01); *H04W 88/18* (2013.01)

(58) Field of Classification Search
CPC ......... H01L 67/10; H01L 67/51; H01L 69/28; H01L 67/34; H04W 88/18; H04W 8/005; H04W 88/14; H04W 60/04
USPC ........................................ 709/223, 225, 226
See application file for complete search history.

(56) References Cited

U.S. PATENT DOCUMENTS

| | | | |
|---|---|---|---|
| 9,451,630 B2 | 9/2016 | Chen et al. | |
| 11,012,328 B2 * | 5/2021 | Taft | ......................... H04L 43/04 |

(Continued)

OTHER PUBLICATIONS

3gPP, "Technical Specification Group Core Network and Terminals; 5G System; Network Function Repository-Services; Stage 3" 3GPP Standard, vol. CT WG4, No. V16.2.0, Dec. 20, 2019, pp. 1-167.

(Continued)

*Primary Examiner* — Frantz Coby
(74) *Attorney, Agent, or Firm* — Lee & Hayes, P.C.

(57) ABSTRACT

Controlling Network Repository Function (NRF) during discovery within a Fifth Generation (5G) network is described. In an example, the NRF can receive, from a Network Function (NF) consumer associated with the 5G network, a request for information associated with a NF producer type. The NRF can receive, from one or more NF producers associated with the NF producer type, indications of the NF producers and the NRF can generate a list of NF producers based at least in part on the indications. The NRF can select, based at least in part on a configurable parameter, a subset of the list of NF producers and send, responsive to receiving the request, the subset of the list of NF producers to the NF consumer.

20 Claims, 5 Drawing Sheets

(51) Int. Cl.
*H04W 88/18* (2009.01)
*H04L 69/28* (2022.01)
*H04L 67/51* (2022.01)

(56) References Cited

U.S. PATENT DOCUMENTS

| | | | |
|---|---|---|---|
| 11,038,783 | B2 | 6/2021 | Wang |
| 11,265,694 | B2 * | 3/2022 | Farooq ................. H04W 8/005 |
| 11,523,307 | B2 * | 12/2022 | Keller ............... H04W 36/0022 |
| 2017/0118689 | A1 | 4/2017 | Zhang et al. |
| 2017/0181052 | A1 | 6/2017 | Zhang et al. |
| 2018/0295032 | A1 | 10/2018 | Yu et al. |
| 2019/0075431 | A1 | 3/2019 | Albasheir et al. |
| 2019/0222489 | A1 | 7/2019 | Shan |
| 2020/0036754 | A1 | 1/2020 | Livanos |
| 2020/0267592 | A1 | 8/2020 | Dowlatkhah et al. |
| 2020/0336554 | A1 | 10/2020 | Deshpande et al. |
| 2022/0014939 | A1 * | 1/2022 | Colom Ikuno ......... G06F 9/541 |
| 2022/0345913 | A1 * | 10/2022 | Al-Dulaimi ............. H04L 47/78 |

OTHER PUBLICATIONS

Extended European Search Report dated Mar. 5, 2021 for European Patent Application No. 21150321.4, 15 pages.
Nokia et al, "Limiting the Number of NFProfiies returned in NFDiscover Response" 3GPP TSG-CT WG4, Feb. 2019, pp. 1-9.
Office Action for U.S. Appl. No. 16/752,498, dated Apr. 8, 2021, Farooq, "Network Repository Function (NRF) Discovery Control", 10 pages.
Office Action for U.S. Appl. No. 16/752,498, dated Nov. 9, 2020, Farooq, "Network Repository Function (NRF) Discovery Control", 12 Pages.

* cited by examiner

NETWORK REPOSITORY FUNCTION (NRF) DISCOVERY CONTROL

RELATED APPLICATIONS

This application is a continuation of and claims priority to U.S. patent application Ser. No. 16/752,498, filed Jan. 24, 2020, titled "NETWORK REPOSITORY FUNCTION (NRF) DISCOVERY CONTROL," the entirety of which is incorporated herein by reference.

BACKGROUND

Fifth generation (5G) radio access technology is associated with the 5G New Radio (NR) standard. 5G technology has more capacity than 4G technology, supporting multiple (e.g., up to 35) Gigabits per second. 5G technology has the potential to deliver higher quality, higher speed, and higher capacity (at even lower costs) than 4G technology. Additionally, 5G technology has significantly lower latency than 4G technology, enabling faster load times. 5G technology can support voice, multimedia, and internet over IP based data transmissions, as well as supporting internet connected devices (Internet of Things (IOT)), autonomous vehicles, virtual and/or augmented reality advancements, and additional and/or alternative use cases.

5G radio access technology is supported by a service-based architecture. A service-based architecture is a style of software design where services are provided to other components by application components, through a communication protocol over a network. The 5G Core Network is a mesh of interconnected services, which can be associated with various functions. One component of the 5G Core Network is a Network Repository Function (NRF) (which can also be called a "Network Function (NF) Repository Function"). The NRF can facilitate service registration and discovery so that various other network functions can discover each other. Details associated with 5G radio access technology and associated 5G Core Network are described in the 3GPP Technical Specification 23.502.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
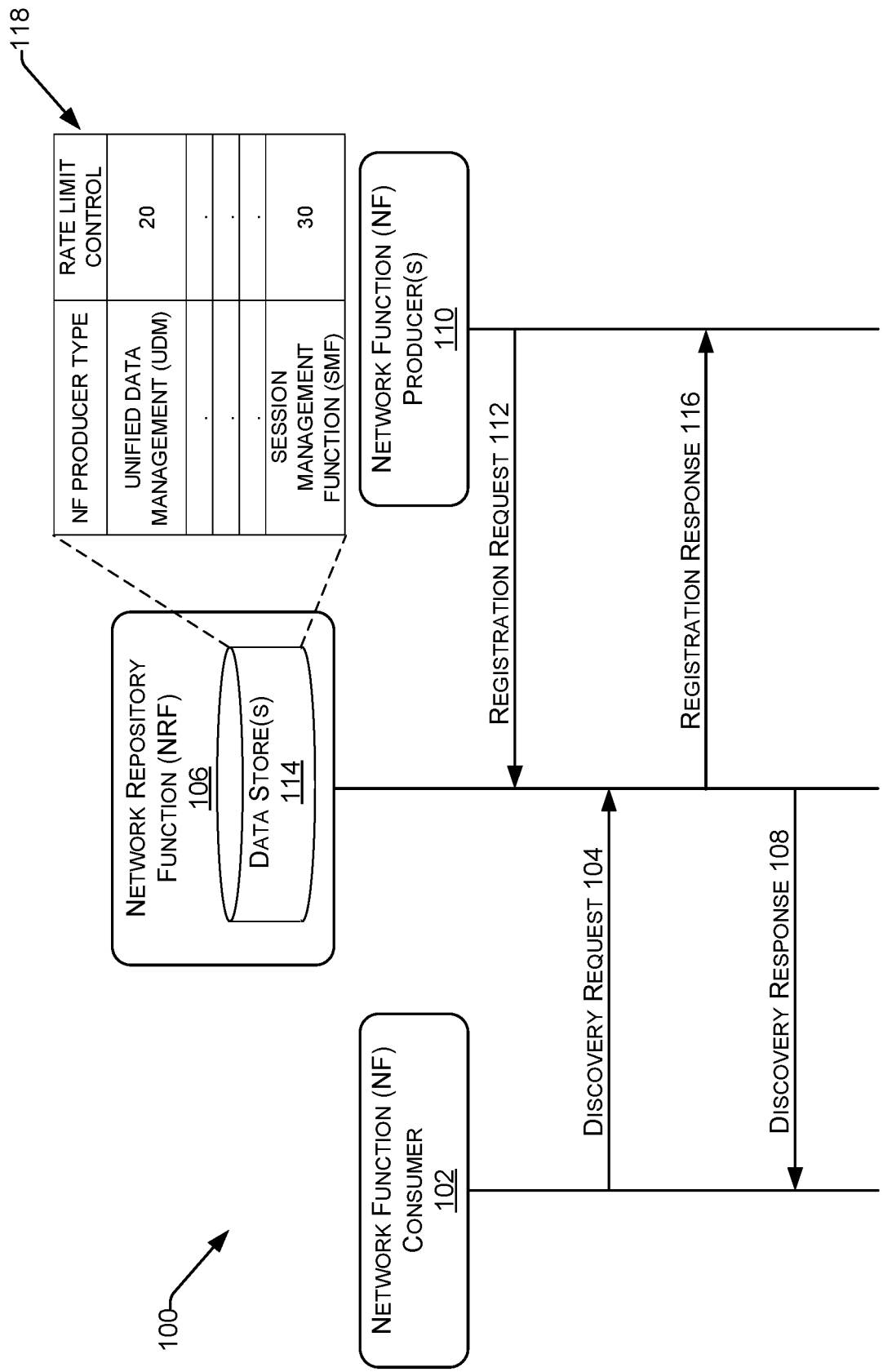
FIG. 1 illustrates an example environment for signaling between functions of a Fifth Generation (5G) mobile network, as described herein.

Techniques described herein are directed to controlling responses to discovery requests received via a Network Repository Function (NRF) in a Fifth Generation (5G) mobile network. As described above, the NRF is responsible for providing a discovery response for specific Network Function (NF) producer types. For example, when a NF consumer (e.g., a 5G NF that consumes services) sends a discovery request, the NRF can access a list of NF producers (e.g., 5G NFs that provide services) for the NF producer type requested. In some examples, there can be several hundred NF producers, and as such, the NRF can respond to a discovery request indicating up to the several hundred NF producers. Techniques described herein are directed to a configurable parameter that can be used by the NRF to reduce the number of indications of NF producers that the NRF responds back to the NF consumer during such discovery events.

The configurable parameter, which can be referred to as a "rate limit control," can be configured by a NF operator (e.g., T-Mobile, AT&T, etc.) so that the number of indications (e.g., of NF producers) returned by the NRF meets or exceeds the number of service types available and provides redundancy, but is less than the total number of NF producers available for a NF producer type. As a result, each NF consumer need not include a load balancer for analyzing discovery responses and instead, the NRF optimizes and throttles the number of indications returned to NF consumers responsive to discovery requests. Thus, NF consumers are not flooded in response to a discovery request.

As described below, the 5G mobile network can include a control plane function group that handles control plane data. In some examples, the control plane function group can manage control plane systems and/or user plane systems that carry data traffic through the network via services availed by the various systems and/or components associated therewith. The NRF described above can be a component of the control plane function group. The NRF can include one or more data stores that store indications of NF producers and corresponding configurable parameters. Responsive to receiving a discovery request from a NF consumer, which can be another component of the control plane function group, the NRF can utilize a configurable parameter (e.g., a "rate limit control") to determine how many indications of NF producers, of a particular NF producer type, to include in a response to the discovery request. The number of indications of NF producers can be based on the configurable parameter and can be less than the total number of NF producers associated with the NF producer type. The NF consumer can then analyze the discovery response to access (or deny) services associated with the discovery request.

Techniques described herein offer various improvements to existing technology. As described above, each type of NF producer can be associated with several NF producers. In some examples, there can be as many as several hundred NF producers associated with an NF producer type. In existing technology, upon receiving a discovery request from a NF consumer, the NRF sends a discovery response that includes indications of all of the NF producers. Such a response can require a significant amount of signaling, consume network resources, and necessitate storage for storing the indications of all of the NF producers. Furthermore, the NF consumer can be flooded by discovery responses that include so many indications. Such flooding can lead to overload conditions in NF consumer. Such overload conditions can cause unavailability of network services. In some examples, the NF consumer can utilize a load balancer for balancing how the NF consumer processes the discovery response, to mitigate the flooding and resulting unavailability of network services.

Techniques described herein, are directed to a throttling mechanism (e.g., a configurable parameter or "rate limit control") that is associated with the NRF. The throttling mechanism can reduce a number of indications of NF producers that are provided to the NF consumer responsive to a discovery request. By reducing the number of indications of NF producers that are provided to the NF consumer, techniques described herein reduce the signaling required in such discovery events and can alleviate the need for a load balancer to be associated with each NF consumer (which can result in a cost savings for NF operators). Furthermore, techniques described herein conserve network resources and reduce the storage requirements for NF consumers. Techniques described herein thereby alleviate discovery response floods that can lead to overload conditions in NF consumers. Such overload conditions can cause unavailability of network services. As such, techniques described herein offer improvements to existing technology. Additional or alternative improvements can be observed throughout the discussion of FIGS. 1-5 below.

FIG. 1 illustrates an example environment 100 for signaling between functions of a 5G mobile network, as described herein. Additional details associated with the 5G mobile network are described below with reference to FIG. 2.

In FIG. 1, a Network Function (NF) consumer 102 sends a discovery request 104 to a Network Repository Function (NRF) 106. In at least one example, the NF consumer 102 can be any one of an Access and Mobility Management Function (AMF), an Authentication Server Function (AUSF), a Network Exposure Function (NEF), a Policy Control Function (PCF), a Session Management Function (SMF), a Unified Data Management (UDM), a Charging Function (CHF), an Equipment Identity Register (EIR), a Location Management Function (LMF), a Session Plane Function (SPF), or the like. Each of the NF consumers described above can be associated with a 5G mobile network and can provide services to user equipment (not pictured in FIG. 1) via the 5G mobile network. Additional details associated with the NF consumers described above are provided below with reference to FIG. 2.

In general, the NRF 106 can be implemented as a network function including functionality to support service discovery (e.g., receive a network function discovery request and provide information associated with the discovered network function instances to a requesting entity). In at least one example, the NRF 106 can maintain records of available network functions and their supported services. The NRF 106 can allow other network functions to subscribe and be notified of registrations from network functions of a given type. In some instances, the NRF 106 can receive utilization information, capability information, etc. from various network functions to provide such utilization information to the other network functions discussed herein. Further, the NRF 106 can select, assign, implement, or otherwise determine network functions to be used in a network based at least in part on utilization information, as discussed herein.

As described above, the NRF 106 can be implemented as a network function that can provide discovery responses to discovery requests in support of support service discovery. In at least one example, a discovery request, such as the discovery request 104, can be associated with a particular NF producer type. In such an example, the discovery response 108 can provide indications of NF producers associated with the particular NF producer type.

FIG. 1 includes Network Function (NF) producer(s) 110. The NF producer(s) 110 can be any one of a SMF, a UDM, an AUSF, a Short Message Service Function (SMSF), a LMF, a Network Slice Selection Function (NSSF), EIR, a Unified Data Repository (UDR), a CHF, a NEF, or the like. Each of the NF producers described above can be associated with a 5G mobile network and can provide services to user equipment (not pictured in FIG. 1) via the 5G mobile network. In some examples, the 5G mobile network can include multiple instances of each type of NF producer described above. Additional details associated with the NF producers described above are provided below with reference to FIG. 2.

In some examples, network functions can assume the role of either NF consumers or NF producers. That is, a NF consumer in a discovery event can be a NF producer in another discovery event. For example, in a first discovery event, a NF consumer can comprise the SMF and in a second discovery event, the SMF can comprise a NF producer. Table 1, provided below, provides non-limiting examples of NF consumer-NF producer pairs.

TABLE 1

| NF Consumer | NF Producer |
| --- | --- |
| AMF | SMF, UDM, AUSF, SMSF, LMF, NSSF, or EIR |
| AUSF | UDM |
| NEF | UDM, SMF, or UDR |
| PCF | CHF or UDR |
| SMF | CHF, NEF, or UDM |
| SMSF | UDM |
| UDM | AUSF or UDR |

In at least one example, each NF producer of the NF producer(s) 110 can register with the NRF 106. That is, the NF producer can send a registration request 112 to the NRF 106, which can include an indication of its presence and profile(s) associated with the NF producer. The registration request 112 can additionally include an indication of services available via the NF producer. The NRF 106 can store such information in one or more data stores 114 associated with the NRF 106. In at least one example, the NRF 106 can provide a registration response 116 responsive to the registration request 112. Additional details associated with such registration procedures are described in the 3GPP Technical Specification 23.502.

In addition to storing the information provided via registration requests, such as the registration request 112, the data store(s) 114 can store a data structure 118 that includes indications of NF producer types and corresponding rate limit controls. As described above, a NF operator associated with services provided via the 5G mobile network (e.g., T-Mobile, AT&T, etc.) can provide a configurable parameter, which can be referred to as a "rate limit control," that can indicate a number of indications of NF producer(s) to be provided responsive to a discovery request, such as the discovery request 104.

In at least one example, the configurable parameter can be configured by the NF operator so that the number of indications (e.g., of NF producers) returned in a discovery response meets or exceeds the number of service types available for the NF producer type and provides redundancy, but is less than the total number of NF producers available for a NF producer type. That is, the configurable parameter can be determined based at least in part on a number of service types available for a NF producer type and a redundancy threshold. The redundancy threshold can be configurable also but can provide an assurance that the NRF 106 can provide a discovery response to a discovery request that includes indications of NF producers, even if an NF producer of a NF producer type is inoperable, unavailable, or the like. As such, the configurable parameter can be based at least in part on a number that satisfies the redundancy threshold. In at least one example, each NF producer type can be associated with its own configurable parameter. That is, a configurable parameter is particular to a NF producer type.

In at least one example, the NF consumer 102 can send a discovery request 104 to the NRF 106 for information associated with a particular NF producer type. The NRF 106 can perform a lookup, or other search, to determine the rate limit control associated with the NF producer type. Based at least in part on determining the rate limit control, the NRF 106 can generate a list of indications of NF producers associated with the NF producer type. In some examples, the NRF 106 may select a subset of indications of NF producers associated with the NF producer type from the total number of NF producers associated with the NF producer type. The number of indications in the subset can be determined based on the rate limit control. The NRF 106 can send the list of indications of the NF producers associated with the NF producer type to the NF consumer 102 via the discovery response 108.

In some examples, the discovery response 108 can be associated with a timer corresponding to a time period after which the list of indications of NF producers associated with the NF producer type expires. The NF consumer 102 can store the list of indications of NF producers and, upon receiving a subsequent request, can determine whether the time period has lapsed (e.g., the list of indications of NF producers has expired). If the time period has lapsed, the NF consumer 102 can send a subsequent discovery request and the process described above can repeat itself. Additional details are described below with reference to FIGS. 4 and 5.

Take as an example, an instance where the NF consumer 102 is the AMF, which can provide authentication services for user equipment. Responsive to a new user equipment requesting to authenticate with the 5G mobile network, the AMF can send a discovery request 104 to the NRF 106 for information associated with the UDM (e.g., NF producer type of UDM). The UDM can provide generation of authentication credentials, user identification, access authorization, subscription management, and the like. The NRF 106 can perform a lookup, or other search, to determine the rate limit control associated with the NF producer type of UDM. In FIG. 1, the rate limit control associated with the NF producer type of UDM is 20. As such, the NRF 106 can generate a list of indications of UDMs. The list can have 20 indications, each associated with a different instance of a UDM. In some examples, the list of 20 indications can be a subset of a larger set of indications. For instance, in the example of UDM, there can be 400-600 instances of UDMs from which the NRF 106 can select the subset of 20. The NRF 106 can send the list of indications of UDMs to the AMF via the discovery response 108. The AMF can then analyze the list of indications of UDMs to determine whether the user associated with the user equipment is authenticated for accessing the 5G mobile network via the NF operator and can send a response to the user equipment indicating such.

Take as another non-limiting example, an instance where the NF consumer 102 is the AMF, which can provide session management for establishing data sessions for user equipment. Responsive to a new user equipment requesting to establish a new data session, the AMF can send a discovery request 104 to the NRF 106 for information associated with the SMF (e.g., NF producer type of SMF). The NRF 106 can perform a lookup, or other search, to determine the rate limit control associated with the NF producer type of SMF. In FIG. 1, the rate limit control associated with the NF producer type of SMF is 30. As such, the NRF 106 can generate a list of indications of SMFs. The list can have 30 indications, each associated with a different instance of a SMF. As described above, in some examples, the list of 20 indications can be a subset of a larger set of indications. The NRF 106 can send the list of indications of SMFs to the AMF via the discovery response 108. The AMF can then analyze the list of indications of SMFs to facilitate the establishment of a data session for the user equipment.

Figure 2:
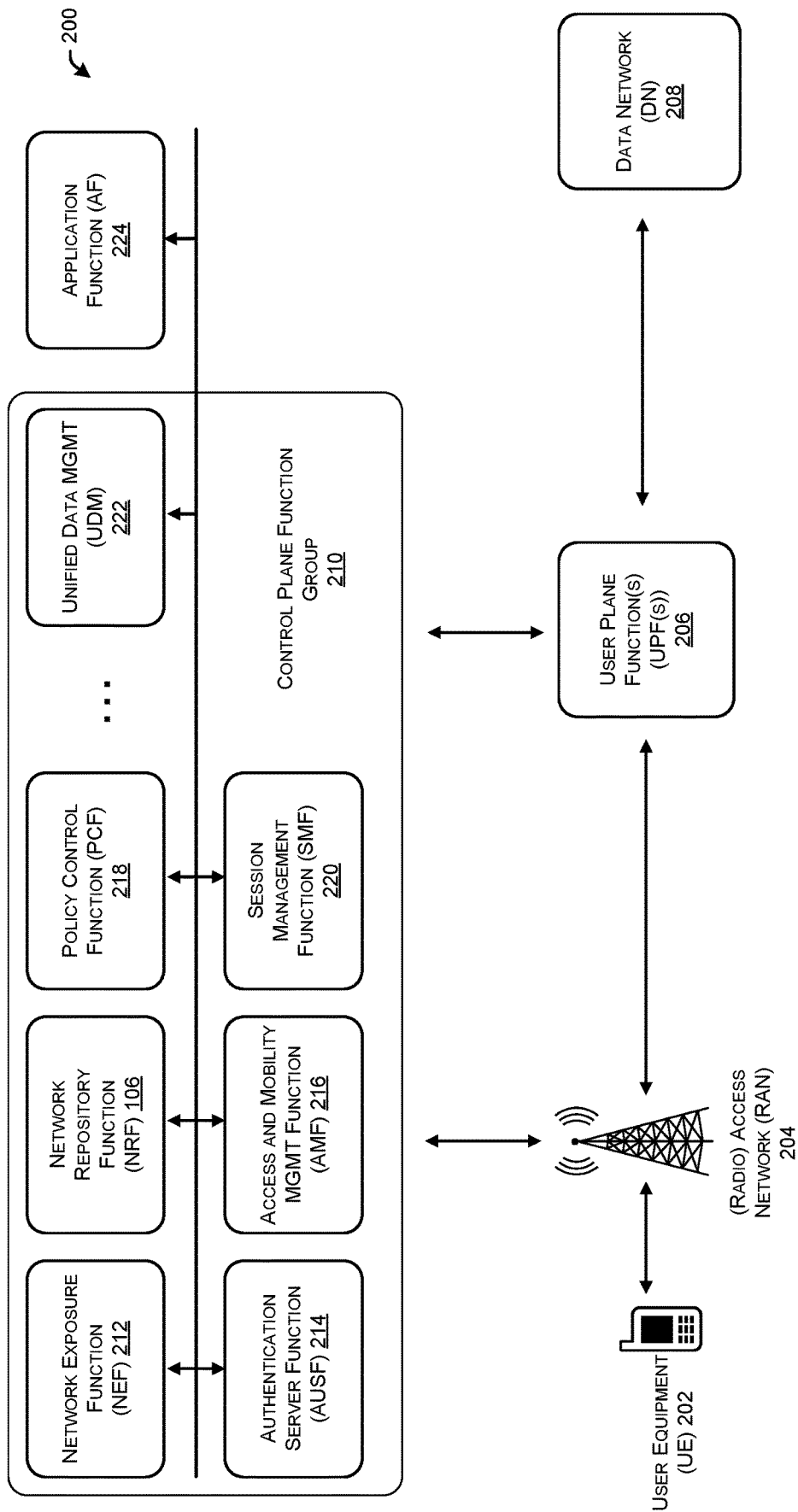
FIG. 2 illustrates an example environment including a user equipment and various components of a 5G mobile network, as described herein.

FIG. 2 illustrates an example environment 200 including a user equipment and various components of a 5G mobile network, as described herein. The example environment 200 includes a user equipment (UE) 202 and various components implementing discovery events, as described herein. For example, the environment 200 includes the UE 202, a (radio) access network (RAN) 204, one or more user plane function(s) (UPF(s)) 206, and a domain or data network (DN) 208.

In accordance with various embodiments described herein, the terms "user equipment (UE)," "user device," "wireless communication device," "wireless device," "communication device," "mobile device," and "client device," can be used interchangeably herein to describe any UE (e.g., the UE 202) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over internet protocol (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future internet protocol (IP)-based network technology or evolution of an existing IP-based network technology.

In general, the UE 202 can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

The UE 202 is configured to utilize various RANs, such as the RAN 204, in order to access the DN 208. In general, the DN 208 is agnostic to the access technology that is used to connect a UE to the DN 208. In this manner, the UE 202 can connect to the DN 208 via the RAN 204, which can include a $3^{rd}$ Generation Partnership Project (3GPP) RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. If the UE 202 accesses the DN 208 through a Wi-Fi access network, the RAN 204 may include a Wi-Fi access point (AP). Providing access to the DN 208 through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage.

In general, the UPF(s) 206 can be implemented as network function(s) including functionality to control data transfer between the UE 202 and the various components of the 5G mobile network. In some instances, the UPF(s) 206 can include functionality to act as an anchor point for radio access technology (RAT) handover (e.g., inter and intra), external protocol data unit (PDU) session point of interconnect to a data network (e.g., the internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like.

In general, the DN 208 can include any public or private network(s), such as the Internet. In addition, the DN 208 may include one or more devices that can receive and transmit data. For example, the DN 208 may include any of media server(s), user device(s), and the like.

In general, a user can further utilize the UE 202 to communicate with other users and associated UEs via an IP multimedia subsystem (IMS) core (sometimes referred to as the "IMS core network," the "IMS network," the "Core Network (CN)," or the "IM CN Subsystem"), which can be at least a portion of the DN 208. IMS is an architectural framework defined by the 3GPP for delivering IP multimedia to a UE, such as the UE 202. The IMS core can be maintained and/or operated by one or more service providers, such as one or more wireless carriers ("carriers"), that provide IMS-based services to users who are associated with UEs, such as the UE 202. For example, a service provider can offer multimedia telephony services that allow a user to call or message other users via the IMS core using his/her UE. In at least one example, the NF operator(s) described herein can correspond to service provider(s) as described herein. A user can also utilize an associated UE to receive, provide, or otherwise interact with various different IMS-based services by accessing the IMS core. It is to be appreciated that any number of base stations and/or IMS nodes can be included in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

In at least one example, as part of a control plane function group 210, the example environment 200 includes, but is not limited to, a Network Exposure Function (NEF) 212, an Authentication Server Function (AUSF) 214, an Access and Mobility Management Function (AMF) 216, a Policy Control Function (PCF) 218, a Session Management Function (SMF) 220, and a Unified Data Management (UDM) 222. The control plane function group 210 can additionally include the NRF 106, described above with reference to FIG. 1. Furthermore, the control plane function group 210 can additionally or alternatively include other functions, including but not limited to, a charging function (CHF), an Equipment Identify Register (EIR), a Location Management Function (LMF), a Session Plane Function (SPF), a Short Message Service Function (SMSF), a Network Slice Selection Function (NSSF), or a Unified Data Repository (UDR). As described above, the network functions can assume roles of either NF consumers or NF producers.

In general, the NEF 212 can be implemented as a network function including functionality to securely expose services and/or capabilities provided by and amongst the various network functions, as discussed herein. In some instances, the NEF 212 receives information from other network functions and can store the received information as structured data using an interface to a data storage network function.

In general, the AUSF 214 can be implemented as a network function including functionality to provide authentication to various devices in the network. For example, the AUSF 214 can request device credentials (e.g., security key(s)), verify that a device is authorized to connect to a network, and/or control access to the network based on the device credentials.

In general, the AMF 216 can be implemented as a network function including functionality to provide UE-based authentication, authorization, mobility management, etc., to various UEs. In some instances, the AMF 216 can include functionality to terminate a RAN control plane interface between the UE 202 and other functions on the network. In some instances, the AMF 216 can include functionality to perform registration management of the UE 202 in a network, connection management, reachability management, mobility management, access authentication, access authorization, security anchor functionality (e.g., receiving and/or transmitting security keys during registration/authorization), and the like.

In general, the PCF 218 can be implemented as a network function including functionality to support unified policy framework to govern network behavior, provide policy rules to control plane functions and/or enforce such rules, and/or implement a front end to access subscription information relevant for policy decisions in a data repository.

In general, the SMF 220 can be implemented as a network function including functionality to manage communication sessions by and between UEs, and/or to provide internet protocol (IP) addresses to the UEs. In some instances, the SMF 220 can select a UPF to provide services to the UE 202 in response to receiving a request from the UE 202, as discussed herein.

In general, the UDM 222 can be implemented as a network function including functionality to process authentication credentials, handle user identification processing, manage registration and/or mobility, manage subscriptions between a UE and a carrier, and/or manage short message service (SMS) data.

As described above, the control plane function group 210 can additionally or alternatively include other functions, including but not limited to, a CHF (e.g., a network function that can be implemented to provide connectivity charging), an EIR (e.g., a network function that can be implemented to provide equipment identity registration, authentication, and/or security services), a LMF (e.g., a network functionality that can be implemented to provide location determinations), a SPF (e.g., a network functionality that can be implemented to provide UE internet protocol (IP) address allocation and protocol data unit session control), a SMSF (e.g., a network functionality that can be implemented to provide SMS services), a NSSF (e.g., a network functionality that can be implemented to provide network slicking services), or a UDR (e.g., a network functionality that can be implemented to store user subscription data, policy data, structured data for exposure, application data, and the like).

The control plane function group 210 can be in communication with an application function (AF) 224. In general, the AF 224 can be implemented as a network function including functionality to route traffic to/from applications operating on the 5G mobile network, facilitate accessing the NEF 212, and interact with the policy framework for policy control in connection with the PCF 218.

In general, the devices and network functions illustrated in the environment 200 can be communicatively coupled via one or more control planes which can pass controls and signaling by and between the various components discussed herein. Further, the environment 200 can include a plurality of each of the various functions (e.g., the SMF 220 can represent a plurality of SMFs, for example). That is, the functions illustrated can represent a NF type and each NF type can include one or more instances of the NF type. The environment 200 can further include additional functions and is not limited to those represented in FIG. 2.

Figure 3:
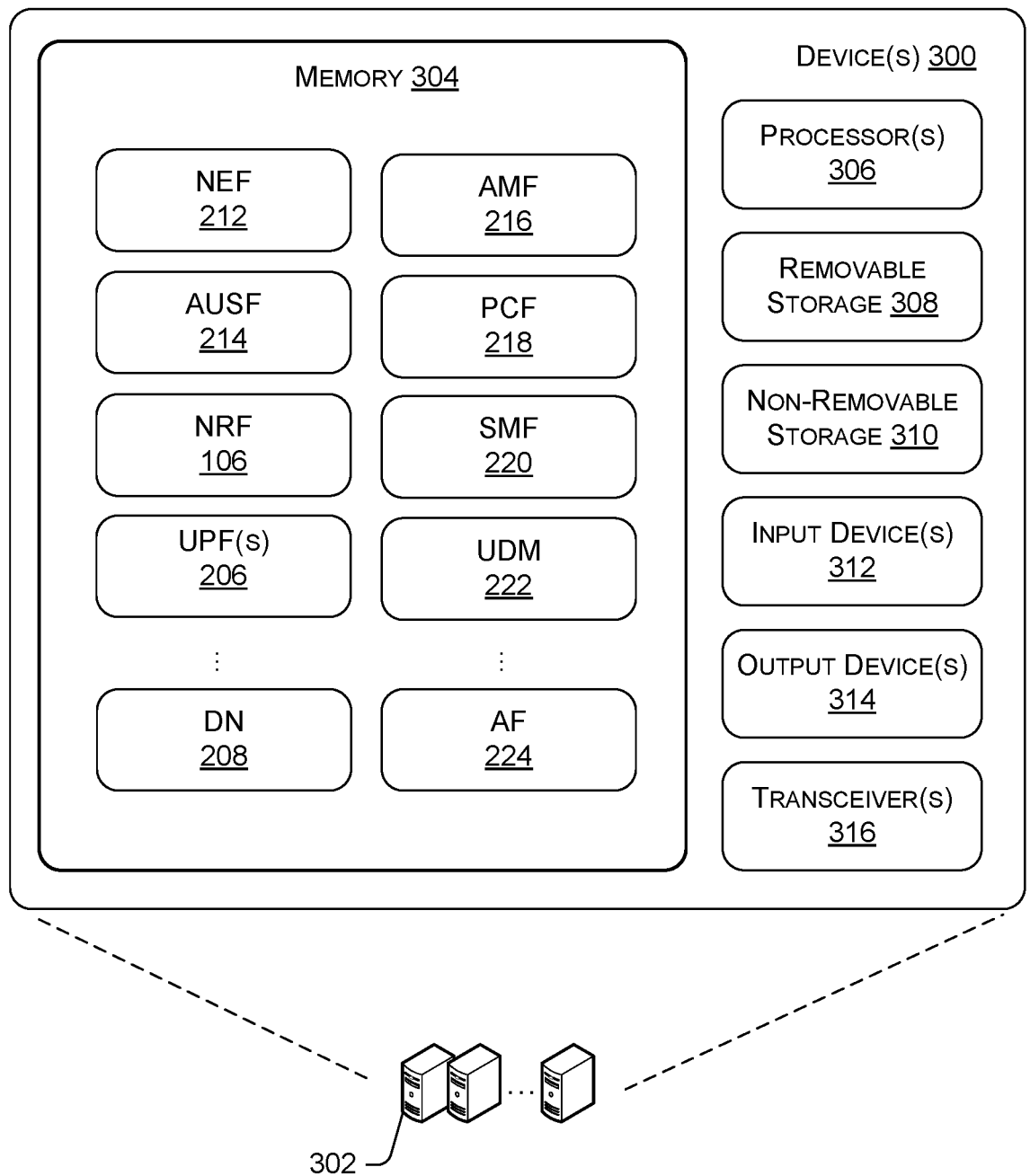
FIG. 3 illustrates example device(s) to facilitate techniques described herein.

FIG. 3 illustrates example device(s) to techniques described herein. In some embodiments, some or all of the functionality discussed herein can be implemented in the device(s) 300. Further, the device(s) 300 can be implemented as one or more server computers 302 (as illustrated in FIG. 3), a network element on a dedicated hardware, as a software instance running on a dedicated hardware, or as a virtualized function instantiated on an appropriate platform, such as a cloud infrastructure, and the like. It is to be understood in the context of this disclosure that the device(s) 300 can be implemented as a single device or as a plurality of devices with components and data distributed among them.

As illustrated, the device(s) 300 comprise a memory 304 storing the NEF 212, the AUSF 214, the NRF 106, the UPF(s) 206, the DN 208, the AMF 216, the PCF 218, the SMF 220, the UDM 222, and the AF 224. In additional or alternative examples, the memory 304 can store a CHF, an EIR, a LMF, a SPF, a SMSF, a NSSF, a UDR, or other network functions as described herein. In various embodiments, the memory 304 may also comprise additional functions and structures that are not explicitly described herein. Also, the device 300 includes processor(s) 306, at least one removable storage 308 and at least one non-removable storage 310, input device(s) 312, output device(s) 314, and transceiver(s) 316.

Aspects of the NEF 212, the AUSF 214, the NRF 106, the UPF(s) 206, the DN 208, the AMF 216, the PCF 218, the SMF 220, the UDM 222, the AF 224 (and the CHF, the EIR, the LMF, the SPF, the SMSF, the NSSF, the UDR, etc.) are discussed above with connection with at least FIGS. 1 and 2. In general, these functions comprise components of a 5G mobile network, as described above.

In various embodiments, the memory 304 is volatile (such as RAM), non-volatile (such as ROM, flash memory, etc.) or some combination of the two. One or more of the NEF 212, the AUSF 214, the NRF 106, the UPF(s) 206, the DN 208, the AMF 216, the PCF 218, the SMF 220, the UDM 222, the AF 224 (and other functions, including but not limited to, the CHF, the EIR, the LMF, the SPF, the SMSF, the NSSF, the UDR, etc.) stored in the memory 304 can comprise methods, threads, processes, applications or any other sort of executable instructions. One or more of the NEF 212, the AUSF 214, the NRF 106, the UPF(s) 206, the DN 208, the AMF 216, the PCF 218, the SMF 220, the UDM 222, the AF 224 (and other functions, including but not limited to, the CHF, the EIR, the LMF, the SPF, the SMSF, the NSSF, the UDR, etc.) can also include files and databases.

In some embodiments, the processor(s) 306 is a central processing unit (CPU), a graphics processing unit (GPU), or both CPU and GPU, or other processing unit or component known in the art.

The device 300 also includes additional data storage devices (removable and/or non-removable) such as, for example, magnetic disks, optical disks, or tape. Such additional storage is illustrated in FIG. 3 by removable storage 308 and non-removable storage 310. Tangible computer-readable media can include volatile and nonvolatile, removable and non-removable media implemented in any method or technology for storage of information, such as computer readable instructions, data structures, program modules, or other data. Memory 304, removable storage 308 and non-removable storage 310 are all examples of computer-readable storage media. Computer-readable storage media include, but are not limited to, RAM, ROM, EEPROM, flash memory or other memory technology, CD-ROM, digital versatile discs (DVDs), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The device 300 also can include input device(s) 312, such as a keypad, a cursor control, a touch-sensitive display, voice input device, etc., and output device(s) 314 such as a display, speakers, printers, etc. These devices are well known in the art and need not be discussed at length here.

As illustrated in FIG. 3, the device 300 also includes one or more wired or wireless transceiver(s) 316. For example, the transceiver(s) 316 can include a network interface card (NIC), a network adapter, a local area network (LAN) adapter, or a physical, virtual, or logical address to connect to the various base stations or networks contemplated herein, for example, or the various user equipment and servers. To increase throughput when exchanging wireless data, the transceiver(s) 316 can utilize multiple-input/multiple-output (MIMO) technology. The transceiver(s) 316 can comprise any sort of wireless transceivers capable of engaging in wireless, radio frequency (RF) communication. The transceiver(s) 316 can also include other wireless modems, such as a modem for engaging in Wi-Fi, WiMAX, Bluetooth, or infrared communication.

Figure 4:
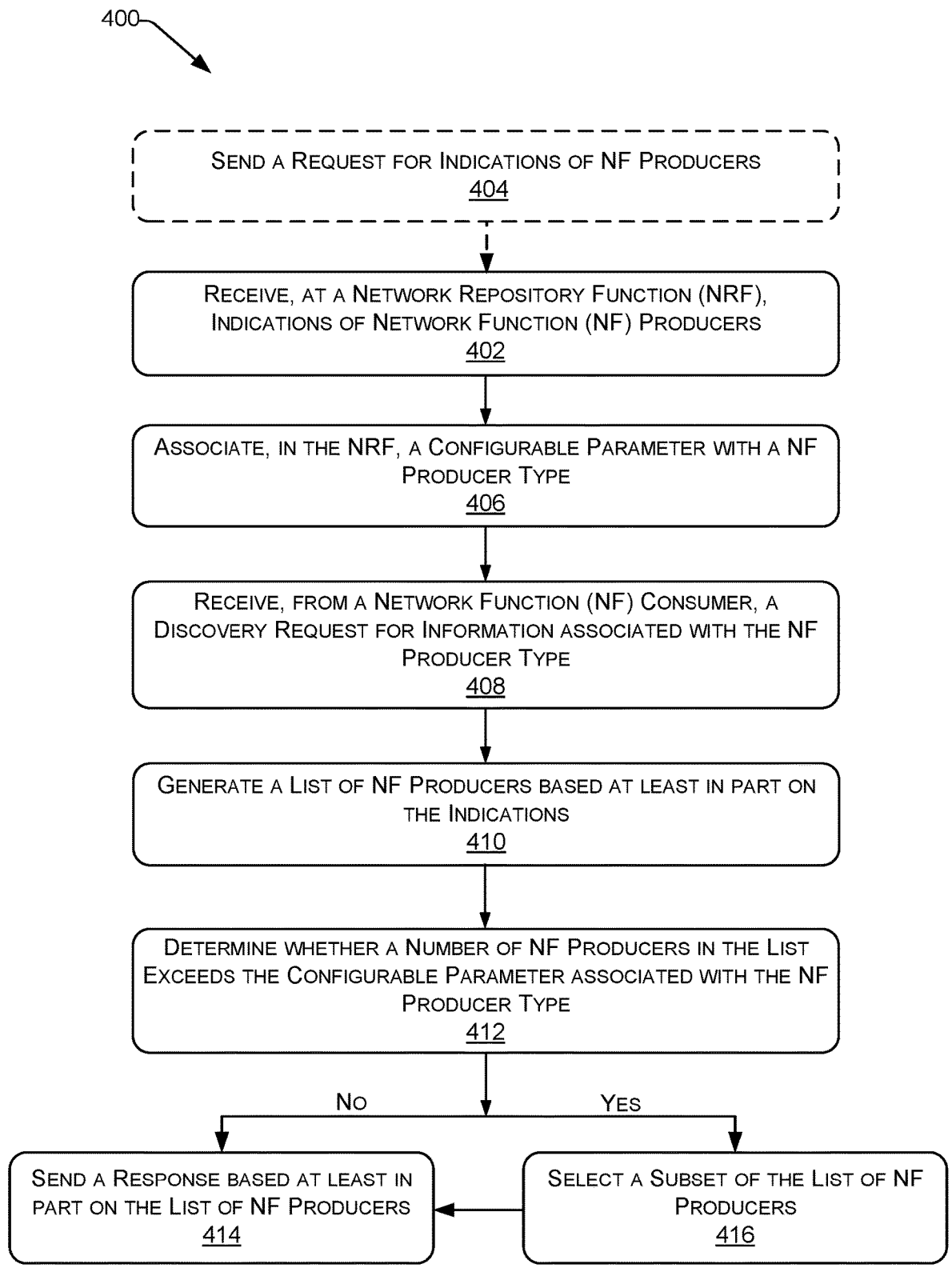
FIG. 4 illustrates an example process for implementing Network Repository Function (NRF) discovery control, as described herein.
Figure 5:
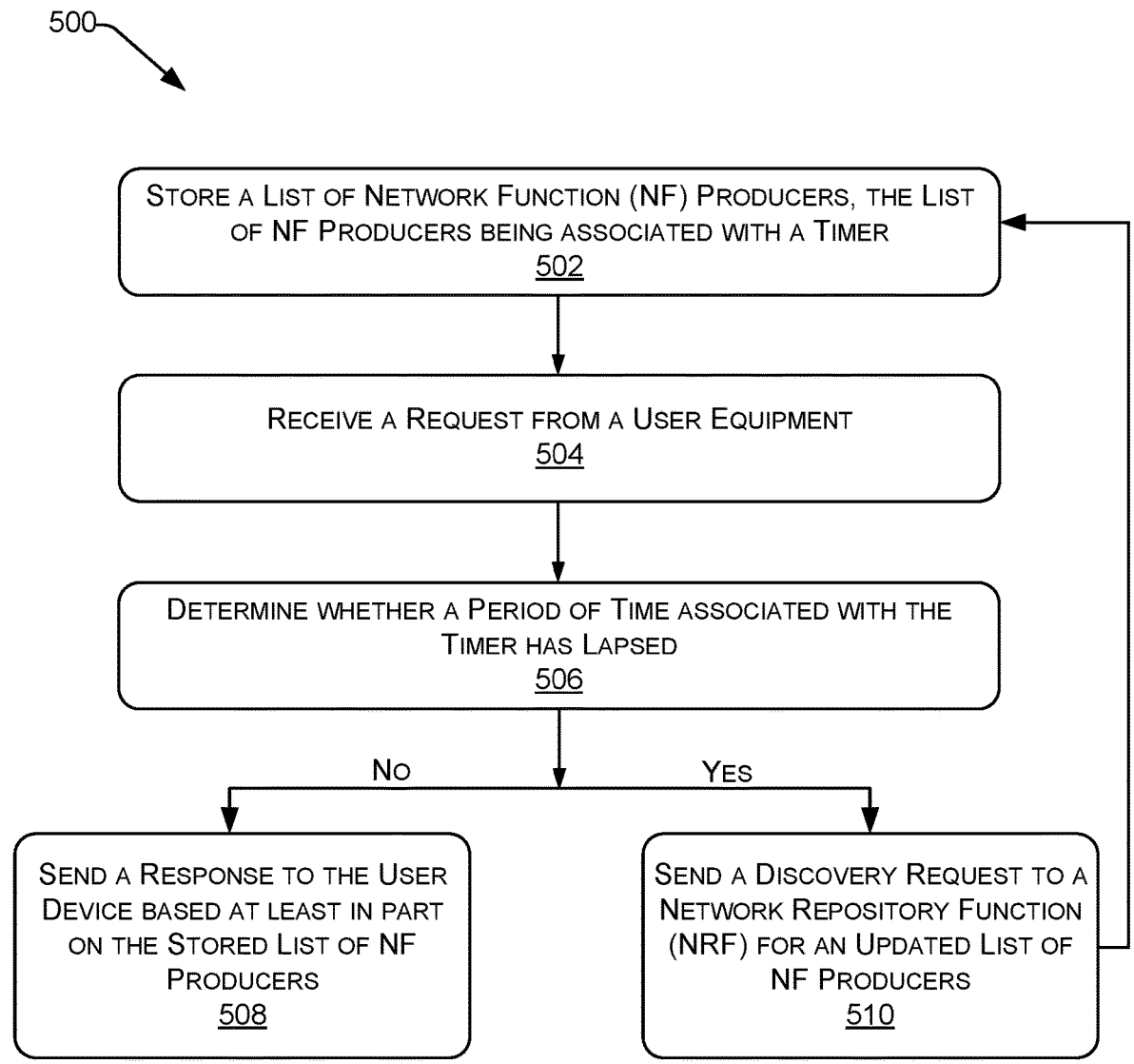
FIG. 5 illustrates another example process for implementing NRF discovery control, as described herein.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for implementing NRF discovery control, as described herein.

Block 402 illustrates receiving, at a Network Repository Function (NRF), indications of Network Function (NF) producers. In at least one example, each NF producer associated with a 5G mobile network can register with the NRF 106. That is, a NF producer can send a registration request to the NRF 106, which can include an indication of its presence and profile(s) associated with the NF producer. The registration request can additionally include an indication of services available via the NF producer. The NRF 106 can store such information in one or more data stores 114 associated with the NRF 106. In some examples, the data store(s) 114 can include information received from a plurality of NF producers associated with the same NF producer type.

Block 404, which is optional, illustrates sending a request for indications of NF producers. In an example, the NF producer(s) 110 can provide information to the NRF 106 in association with registration, as described above. In other examples, the NF producer(s) 110 can provide such information to the NRF 106 responsive to the NRF 106 sending a request for such information.

Block 406 illustrates associating, in the NRF, a configurable parameter with a NF producer type. As described above, a NF operator associated with services provided via the 5G mobile network (e.g., T-Mobile, AT&T, etc.) can provide a configurable parameter, which can be referred to as a "rate limit control," that can indicate a number of indications of NF producer(s) associated with a NF producer type to be provided responsive to a discovery request, such as the discovery request 104. In at least one example, the configurable parameter can be configured by the NF operator so that the number of indications (e.g., of NF producers) returned in a discovery response meets or exceeds the number of service types available for the NF producer type and provides redundancy, but is less than the total number of NF producers available for a NF producer type. That is, the configurable parameter can be determined based at least in part on a number of service types available for a NF producer type and a redundancy threshold. The redundancy threshold can be configurable also but can provide an assurance that the NRF 106 can provide a discovery response to a discovery request that includes indications of NF producers, even if an NF producer of a NF producer type is inoperable, unavailable, or the like. As such, the configurable parameter can be based at least in part on a number that satisfies the redundancy threshold. In at least one example, each NF producer type can be associated with its own configurable parameter. That is, a configurable parameter is particular to a NF producer type.

In at least one example, the data store(s) 114 can store a data structure 118 that includes indications of NF producer types and corresponding rate limit controls. That is, the NRF 106 can associate configurable parameters provided by NF operators with corresponding NF producer types.

Block 408 illustrates receiving, from a Network Function (NF) consumer, a discovery request for information associated with the NF producer type. As described above, the NRF 106 can be implemented as a network function including functionality to support service discovery (e.g., receive a network function discovery request and provide information associated with the discovered network function instances to a requesting entity). In at least one example, the NRF 106 can maintain records of available network functions and their supported services. The NRF 106 can allow other network functions to subscribe and be notified of registrations from network functions of a given type. In at least one example, a NF consumer 102 can send a discovery request to the NRF 106 for information associated with a particular NF producer type.

Block 410 illustrates generating a list of NF producers based at least in part on the indications. In at least one example, responsive to receiving the request for information associated with the NF producer type, the NRF 106 can perform a lookup, or other search, to access indications of NF producers associated with the NF producer type. The NRF 106 can generate a list of indications of NF producers associated with the NF producer type. In at least one example, the initial list of indications of NF producers associated with the NF producer type can include indications of all NF producers associated with the NF producer type.

Block 412 illustrates determining whether a number of NF producers in the list exceeds the configurable parameter associated with the NF producer type. In at least one example, the NRF 106 can compare the number of indications of the NF producers with the configurable parameter to determine whether the number of indications exceeds the configurable parameter. If the number of indications does not exceed the configurable parameter, the NRF 106 can send a response based at least in part on the list of NF producers to the NF consumer 102, as illustrated in block 414. That is, the NRF 106 can send the list of indications of NF producers to the NF consumer 102. However, if the number of indications exceeds the configurable parameter, the NRF 106 can select a subset of indications of the NF producers to generate another list, as illustrated in block 416. The number of indications in the subset can be determined based on the configurable parameter. The NRF 106 can send the new (e.g., reduced) list of indications of the NF producers associated with the NF producer type to the NF consumer 102 via the discovery response, as illustrated in block 414.

That is, the configurable parameter, which can be referred to as a "rate limit control," can be configured by the NF operator (e.g., T-Mobile, AT&T, etc.) so that the number of indications (e.g., of NF producers) returned by the NRF 106 (in association with a discovery response) meets or exceeds the number of service types available and provides redundancy, but is less than the total number of NF producers available for a NF producer type. As a result, the NF consumer 102 need not include a load balancer for sorting through discovery responses and instead, the NRF 106 optimizes and throttles the number of indications returned to NF consumer 102 responsive to the discovery request. Thus, NF consumer 102 is not flooded in response to a discovery request.

FIG. 5 illustrates another example process 500 for implementing NRF discovery control, as described herein.

Block 502 illustrates storing a list of Network Function (NF) producers, the list of NF producers being associated with a timer. As described above with reference to FIG. 4, a NF consumer 102 can receive a list of indications of NF producers of a NF producer type from the NRF 106, responsive to sending a discovery request to the NRF 106. In some examples, the discovery response can be associated with a timer corresponding to a time period after which the list of indications of NF producers associated with the NF producer type expires. The NF consumer 102 can store the list of indications of NF producers.

Block 504 illustrates receiving a discovery request from a user equipment. As described above, a NF consumer 102 can receive a request (e.g., for services via the 5G mobile network) from a UE 202.

Block 506 illustrates determining whether a period of time associated with the timer has lapsed. Upon receiving the request, the NF consumer 102 can determine whether the time period has lapsed (e.g., the list of indications of NF producers has expired). If the period of time has not lapsed, the NF consumer 102 can send a response to the user equipment based at least in part on the stored list of NF producers, as block 508 illustrates. If the period of time has lapsed, the NF consumer 102 can send a discovery request to a Network Repository Function (NFR) for an updated list of NF producers, as illustrated in block 510. Responsive to sending the other discovery request, the NF consumer 102 can receive an updated list of NF producers (via the example process 400 described above with reference to FIG. 4) and can store the (updated) list of NF producers(s), as illustrated in block 502. In such an example, the updated list can be associated with a timer, indicating a period of time for which the updated list is valid (e.g., not expired).

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

What is claimed is:

1. A method, implemented at a Network Repository Function (NRF) associated with a Fifth Generation (5G) network, the method comprising:
   receiving, from a Network Function (NF) consumer associated with the 5G network, a discovery request for information associated with a NF producer type;
   receiving, from NF producers associated with the NF producer type, indications of the NF producers;
   generating a list of NF producers based at least in part on the indications;
   selecting, based at least in part on a configurable parameter, a subset of the list of NF producers; and
   sending, responsive to receiving the discovery request, the subset of the list of NF producers to the NF consumer,
   wherein the configurable parameter is configured based at least in part on a number of service types available for the NF producer type.

2. The method as claim 1 recites, further comprising:
   associating the subset of the list of NF producers with a timer associated with a period of time after which the list of NF producers expires; and
   sending the timer with the subset of the list of NF producers to the NF consumer.

3. The method as claim 2 recites, further comprising receiving, from the NF consumer, another discovery request for information associated with information associated with the NF producer type after a lapse of the period of time.

4. The method as claim 1 recites, wherein the configurable parameter is configured for the NF producer type.

5. The method as claim 1 recites, wherein the subset of the list of NF producers is sent to the NF consumer without communicating with a load balancer.

6. The method as claim 1 recites, wherein the configurable parameter is configured to satisfy a redundancy threshold.

7. The method as claim 1 recites, wherein the indications are received from the NF producers associated with the NF producer type in association with registration of the NF producers with the NRF.

8. The method as claim 1 recites, wherein the indications are received from the NF producers associated with the NF producer type responsive to a request from the NRF.

9. The method as claim 1 recites, wherein the NF consumer comprises at least one of an Access and Mobility Management Function (AMF), an Authentication Server Function (AUSF), a Network Exposure Function (NEF), a Policy Control Function (PCF), a Session Management Function (SMF), a Unified Data Management (UDM), a Charging Function (CHF), an Equipment Identity Register (EIR), a Location Management Function (LMF), or a Session Plane Function (SPF).

10. The method as claim 1 recites, wherein a NF producer comprises at least one of a Session Management Function (SMF), a Unified Data Management (UDM), an Authentication Server Function (AUSF), a Short Message Service Function (SMSF), a Location Management Function (LMF), a Network Slice Selection Function (NSSF), an Equipment Identity Register (EIR), a Unified Data Repository (UDR), a Charging Function (CHF), or a Network Exposure Function (NEF).

11. A system comprising:
    one or more processors;
    one or more non-transitory computer-readable media storing instructions that, when executed by the one or more processors, cause the system to perform operations comprising:
        receiving, from a Network Function (NF) consumer associated with a Fifth Generation (5G) network, a request for information associated with a NF producer type;
        receiving, from one or more NF producers associated with the NF producer type, indications of the NF producers;
        generating a list of NF producers based at least in part on the indications;
        selecting, based at least in part on a configurable parameter, a subset of the list of NF producers; and
        sending, responsive to receiving the request, the subset of the list of NF producers to the NF consumer,
        wherein the configurable parameter is configured for the NF producer type and based at least in part on a redundancy threshold.

12. The system as claim 11 recites, the operations further comprising:
    associating the subset of the list of NF producers with a timer associated with a period of time after which the list of NF producers expires; and
    sending the timer with the subset of the list of NF producers to the NF consumer, wherein the system receives another request for information associated with information associated with the NF producer type after a lapse of the period of time.

13. The system as claim 11 recites, wherein the configurable parameter is configured for the NF producer type and based at least in part on a number of services associated with the NF producer type.

14. The system as claim 11 recites, wherein the system comprises a Network Repository Function (NRF) and the request is associated with a discovery event.

15. The system as claim 14 recites, wherein the indications are received from the NF producers associated with the NF producer type in association with registration of the NF producers with the NRF.

16. One or more non-transitory computer-readable media storing instructions that, when executed by one or more processors, cause a Network Repository Function (NRF) of a Fifth Generation (5G) Network to perform operations comprising:
- receiving, from a Network Function (NF) consumer associated with the 5G network, a request for information associated with a NF producer type;
- receiving, from one or more NF producers associated with the NF producer type, indications of the NF producers;
- generating a list of NF producers based at least in part on the indications;
- selecting, based at least in part on a configurable parameter, a subset of the list of NF producers; and
- sending, responsive to receiving the request and without associating a load balancer, the subset of the list of NF producers to the NF consumer.

17. The one or more non-transitory computer-readable media as claim 16 recites, the operations further comprising:
- associating the subset of the list of NF producers with a timer associated with a period of time after which the list of NF producers expires; and
- sending the timer with the subset of the list of NF producers to the NF consumer, wherein the NRF receives another request for information associated with information associated with the NF producer type after a lapse of the period of time.

18. The one or more non-transitory computer-readable media as claim 16 recites, wherein the configurable parameter is configured for the NF producer type and based at least in part on a number of services associated with the NF producer type or a redundancy threshold.

19. The one or more non-transitory computer-readable media as claim 16 recites, wherein the indications are received from the NF producers associated with the NF producer type in association with registration of the NF producers with the NRF.

20. The one or more non-transitory computer-readable media as claim 16 recites, wherein:
- the NF consumer comprises at least one of an Access and Mobility Management Function (AMF), an Authentication Server Function (AUSF), a Network Exposure Function (NEF), a Policy Control Function (PCF), a Session Management Function (SMF), a Unified Data Management (UDM), a Charging Function (CHF), an Equipment Identity Register (EIR), a Location Management Function (LMF), or a Session Plane Function (SPF);
- the NF producers comprise at least one of a Session Management Function (SMF), a Unified Data Management (UDM), an Authentication Server Function (AUSF), a Short Message Service Function (SMSF), a Location Management Function (LMF), a Network Slice Selection Function (NSSF), an Equipment Identity Register (EIR), a Unified Data Repository (UDR), a Charging Function (CHF), or a Network Exposure Function (NEF); and
- the NF consumer is different than the NF producers.

* * * * *